Nov. 24, 1953 — O. POLSON ET AL — 2,659,943
WINDOW
Filed Nov. 12, 1947 — 8 Sheets-Sheet 2
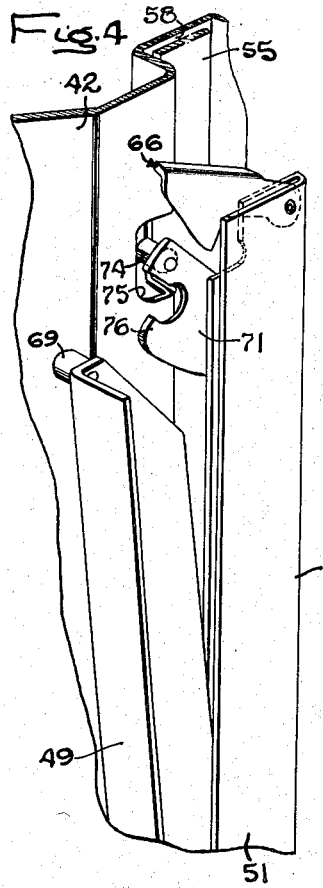
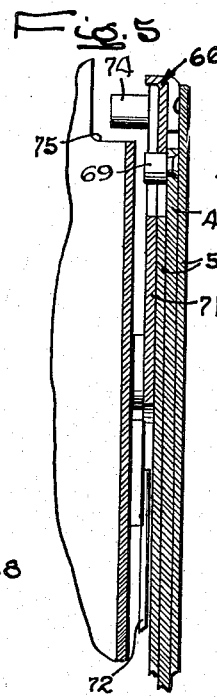
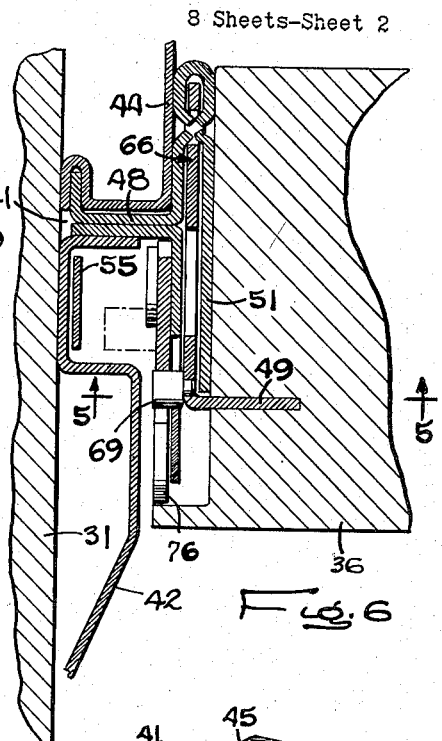
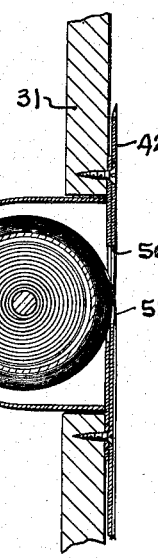
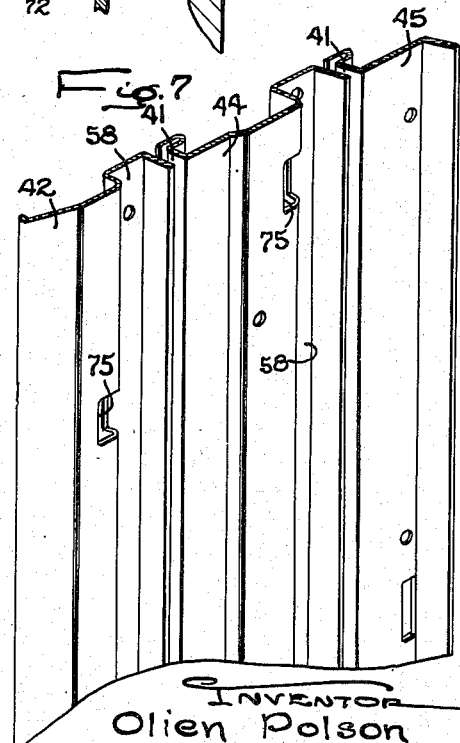
INVENTOR
Olien Polson
Theodore J. Nelson
Carlson, Pitzner, Hubbard & Wolfe
ATTORNEYS Nov. 24, 1953     O. POLSON ET AL     2,659,943
WINDOW
Filed Nov. 12, 1947     8 Sheets-Sheet 3
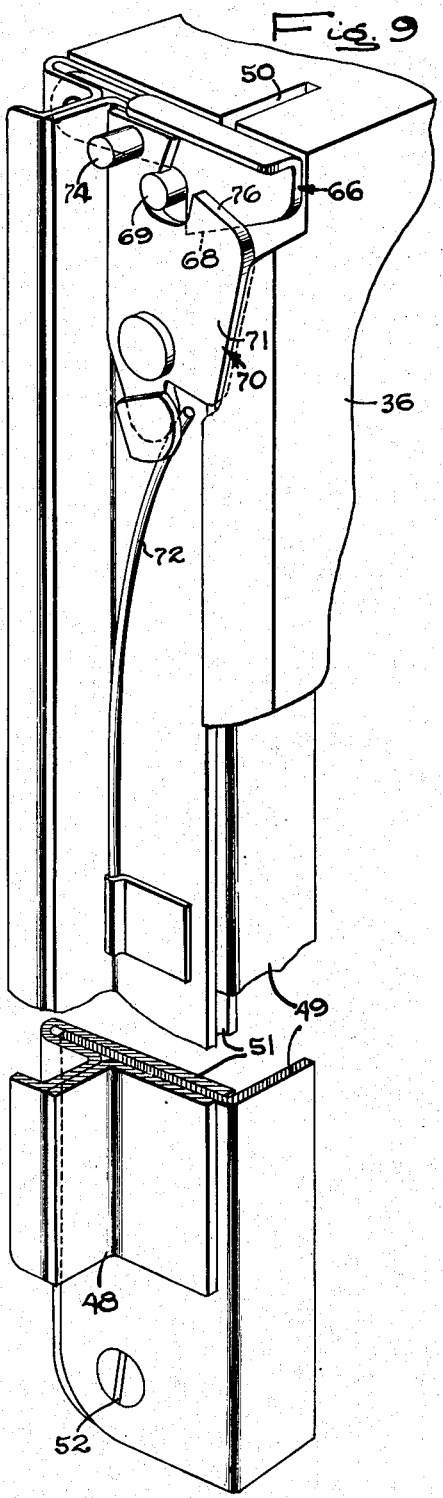
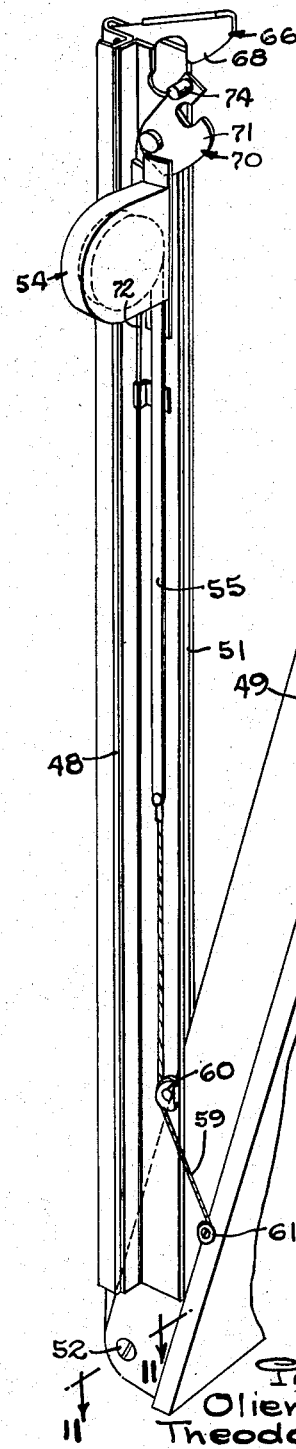
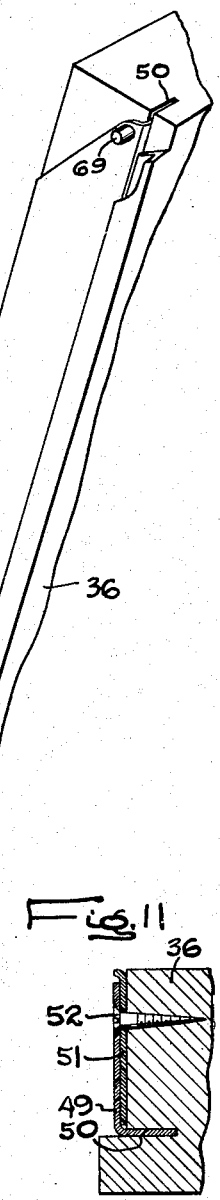
INVENTOR
Olien Polson
Theodore J. Nelson
Carlson, Pitzner, Hubbard & Wolfe
ATTORNEYS

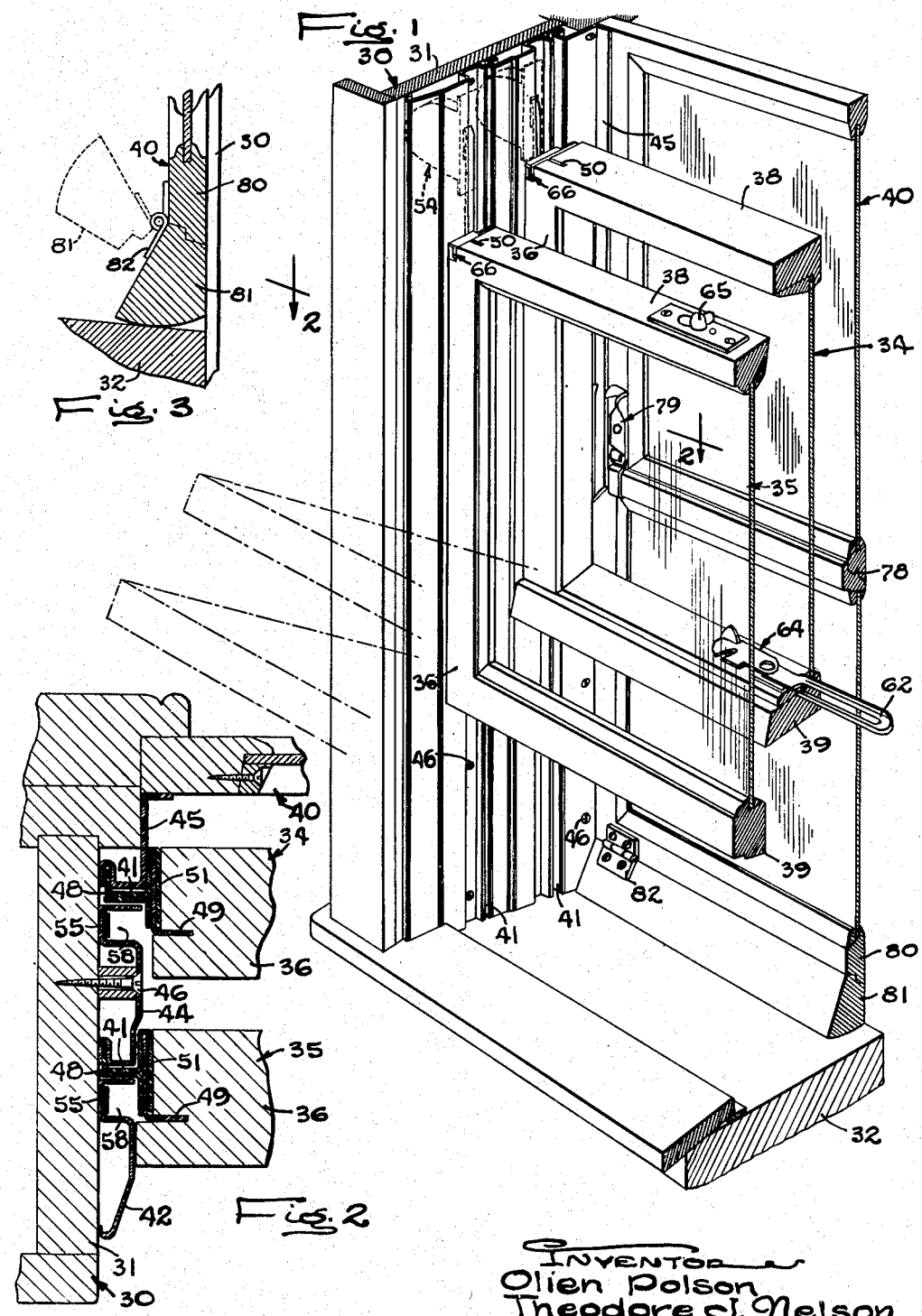

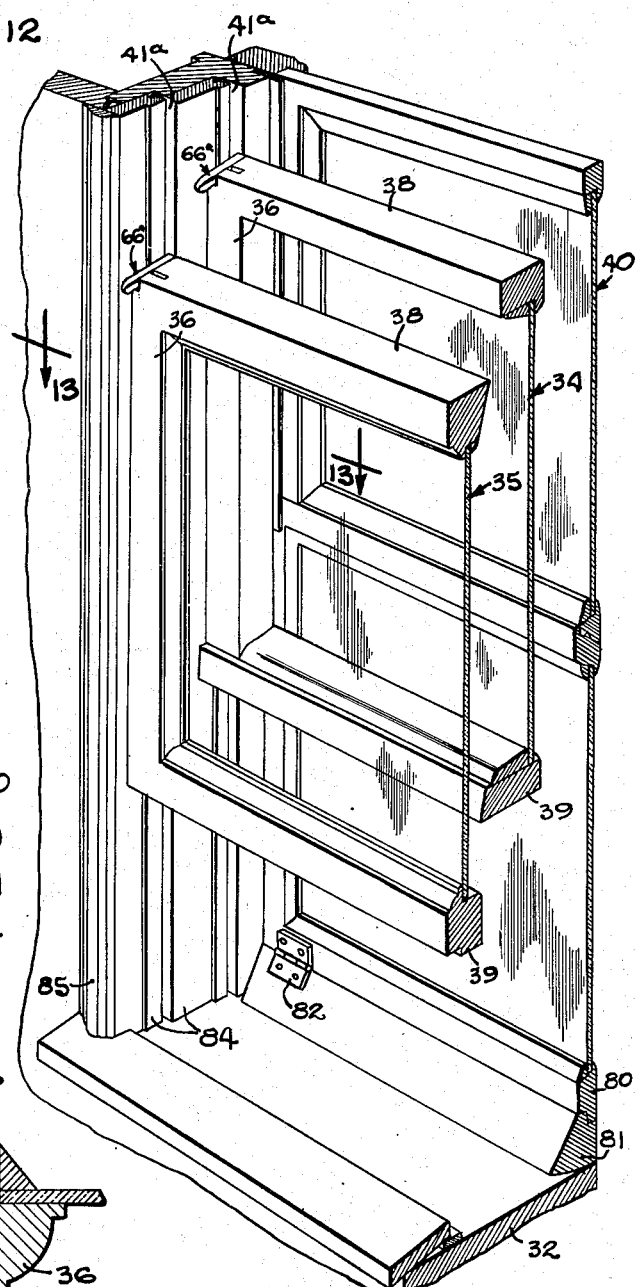
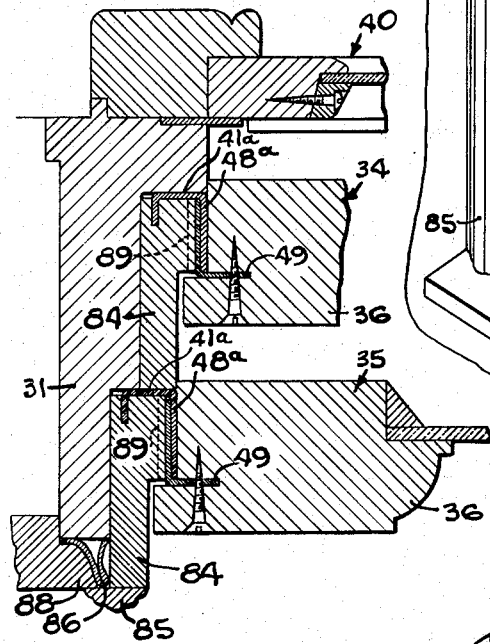

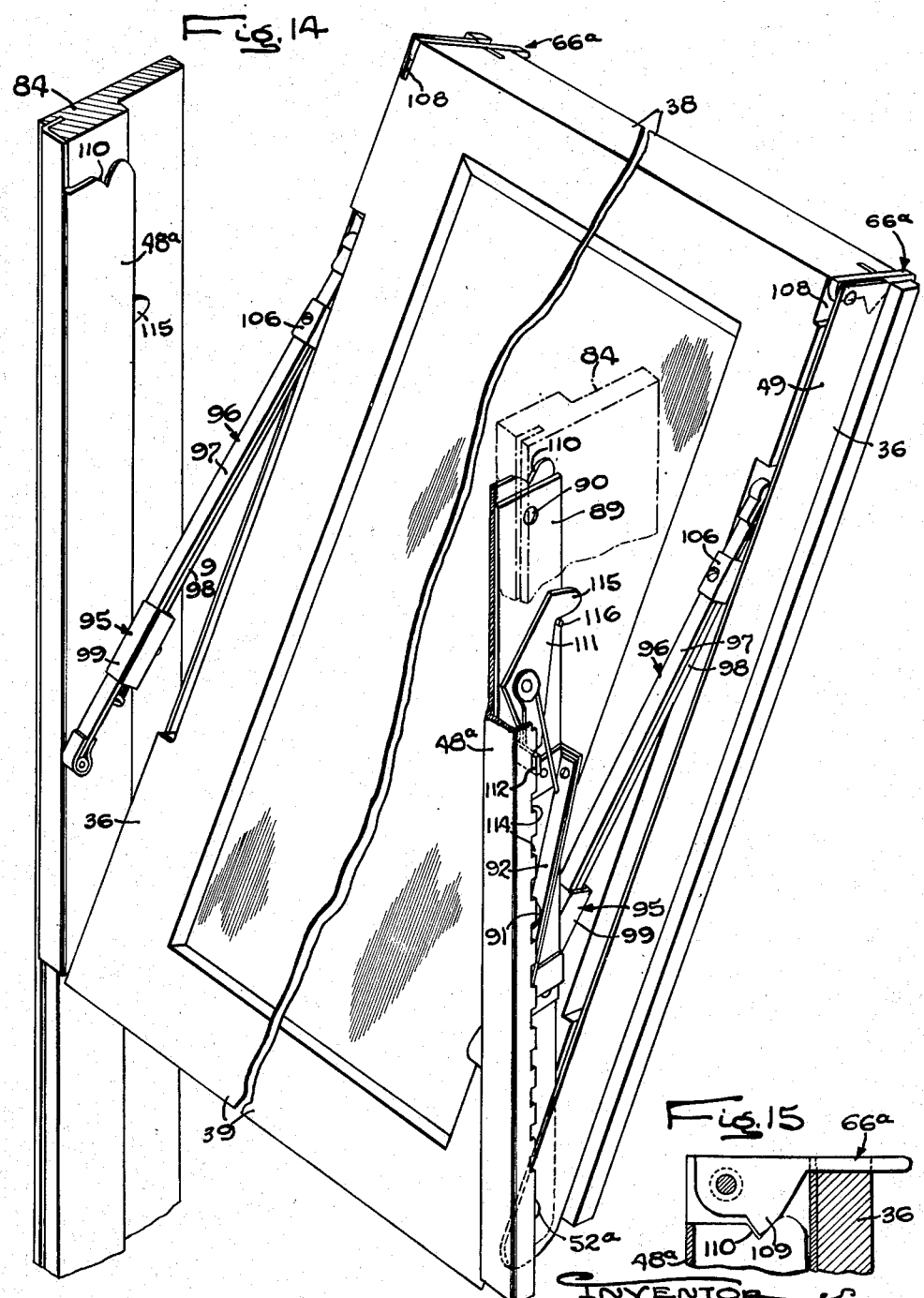

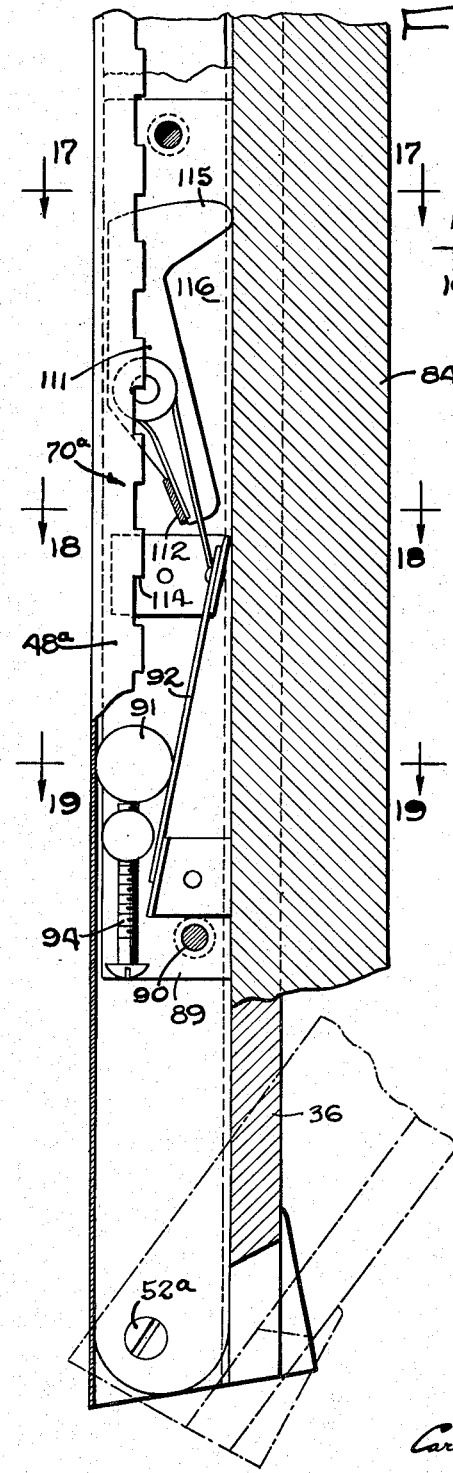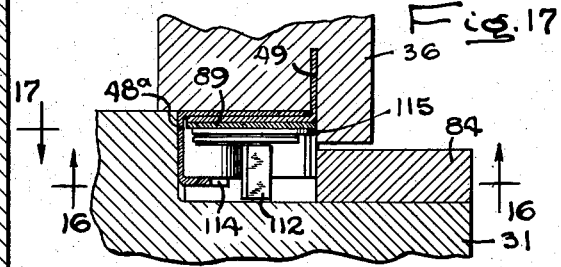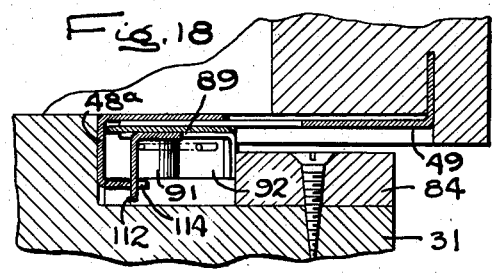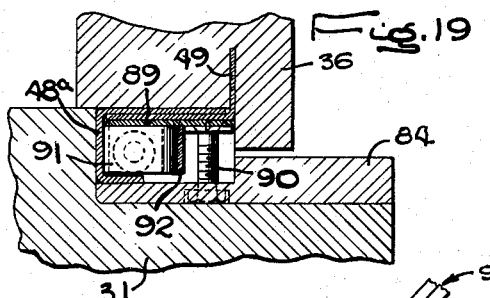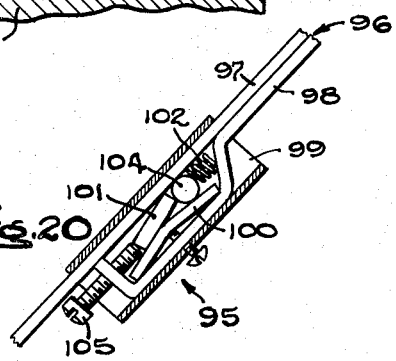

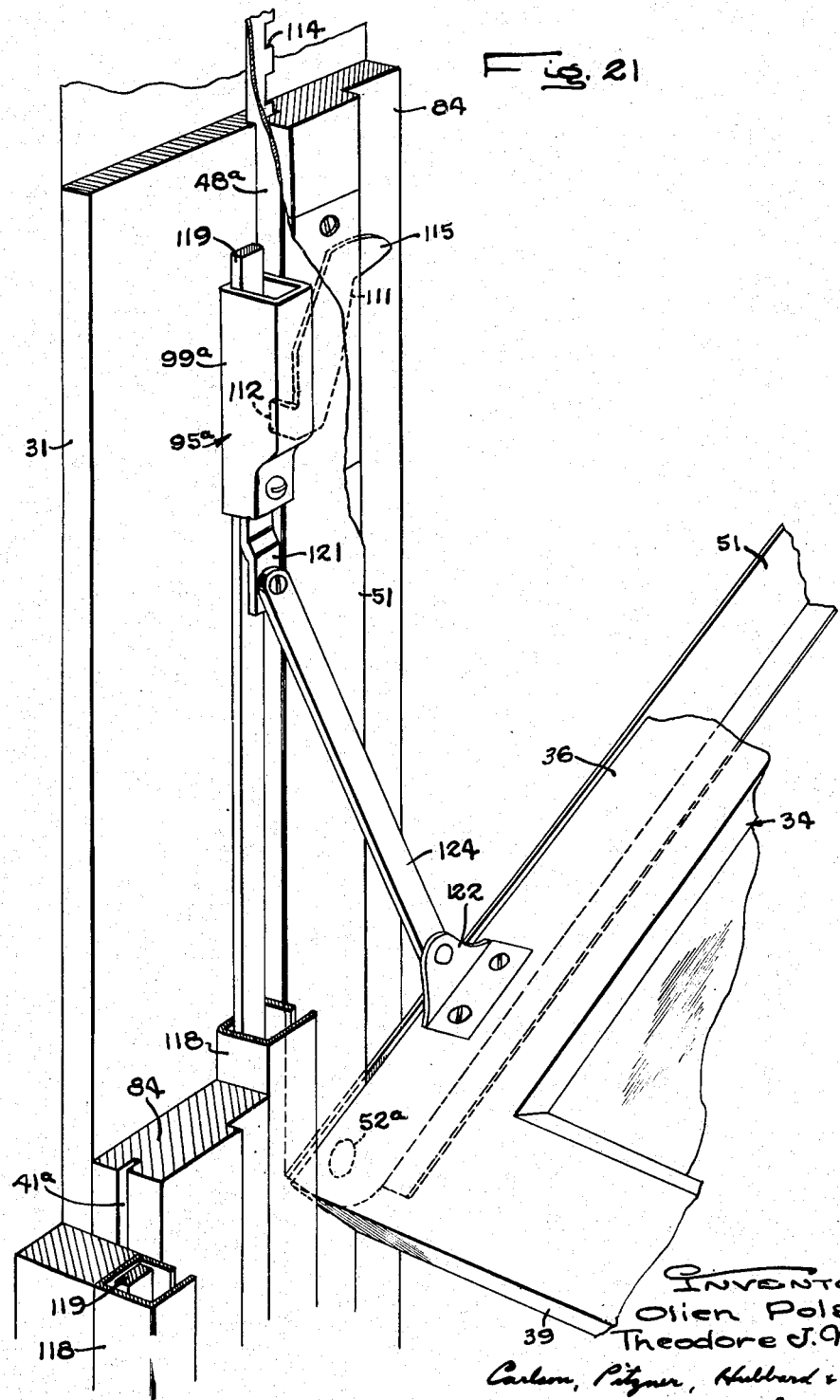

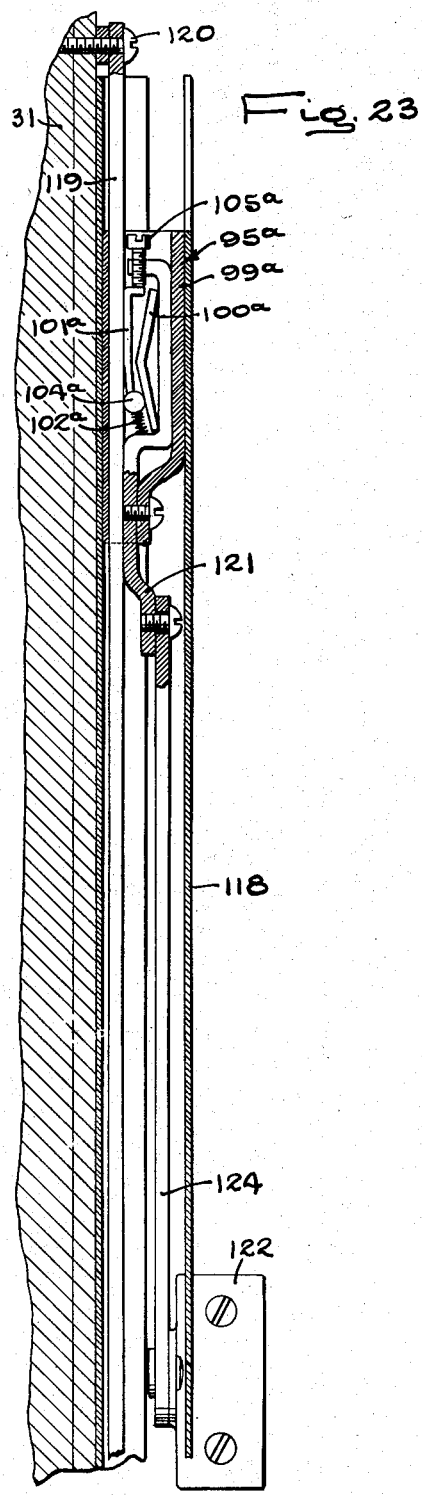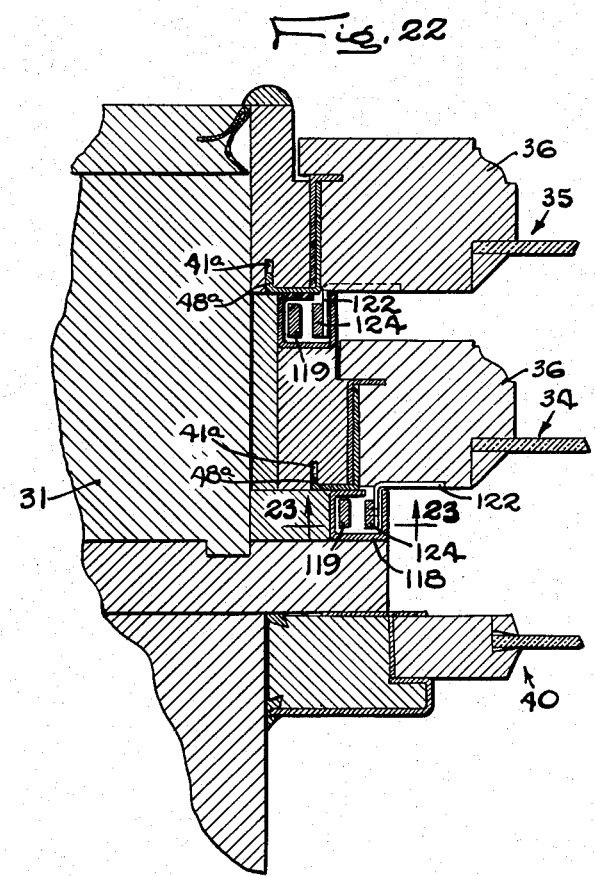

Patented Nov. 24, 1953

2,659,943

UNITED STATES PATENT OFFICE 2,659,943

WINDOW

Olien Polson and Theodore J. Nelson, Chicago, Ill.

Application November 12, 1947, Serial No. 785,262

4 Claims. (Cl. 20—49)

The present invention pertains generally to the construction of windows and more particularly to certain novel developments in that field and which are of wide utility in both new and existing installations.

One of the objects of the invention is to provide a window having all the advantages inherent in a conventional one and which will be susceptible of being cleaned with absolute safety regardless of the altitude at which it may be located. The accomplishment of this objective involves the use of inwardly swingable sashes.

Another object is to provide a window having novel and useful position controlling means for both the sliding and the swinging movements of the sashes.

A further object is to provide a window construction of utility not only in new installations but of sufficiently low cost to permit it to be used in the economical conversion of old ones.

Still another object is to provide a window suitable for year-round use, being susceptible of wide adjustments for either direct or indirect ventilation and also adequately weather stripped to withstand extremely cold weather.

Further objects and advantages will become apparent as the following description proceeds taken in connection with the accompanying drawings wherein:

Figure 1 is a fragmentary perspective view of an illustrative window embodying the present invention.

Fig. 2 is an enlarged fragmentary horizontal sectional view taken in the plane of the line 2—2 of Fig. 1.

Fig. 3 is an enlarged fragmentary vertical sectional view through the bottom rail of the storm sash shown in Fig. 1.

Fig. 4 is a fragmentary perspective view showing in some detail the relationship between the interlock on a sash carrier and the parts on the sash and on the jamb with which such interlock coacts.

Fig. 5 is a fragmentary vertical sectional view through an assembly comprising a sash carrier, a retainer latch and a carrier interlock, taken in approximately the plane of the line 5—5 of Fig. 6.

Fig. 6 is an enlarged fragmentary horizontal sectional view of the assembly illustrated in Fig. 5, the section being taken approximately through the pivot point of the retainer latch.

Fig. 7 is a fragmentary perspective view of the sections of molding which are assembled to form guideways on the jambs of the window frame.

Fig. 8 is a vertical sectional view through one of the several spiral spring units used for supporting the weight of the sashes.

Fig. 9 is an enlarged fragmentary perspective view showing a sash rigidly locked in a vertical position against a sash carrier and for sliding movement therewith, the carrier interlock and retainer latch being illustrated in detail.

Fig. 10 is a fragmentary perspective view showing the side rail of a sash which has been released and tilted inwardly with respect to a sash carrier, the arrangements for positioning the sash both vertically and at angles less than vertical being shown in detail.

Fig. 11 is a horizontal sectional view through the pivot of Fig. 10 and taken in the plane of the line 11—11.

Fig. 12 is a fragmentary perspective view of a window also embodying the invention but having modified guideways and position controlling means for the sash.

Fig. 13 is a horizontal sectional view through one side of the window illustrated in Fig. 12 and taken in the plane of the line 13—13.

Fig. 14 is a fragmentary perspective view of the window of Fig. 12, illustrating the relationship of the sash carriers to the guideways and to the sash, the latter being tilted inwardly.

Fig. 15 is a fragmentary vertical sectional view through one of the latches on the sash shown in Fig. 14.

Fig. 16 is a fragmentary vertical sectional view through a stationary assembly comprising a carrier interlock together with a roller friction device for adjustably retaining the sash and its carriers at any desired vertical position, the section being taken in the plane of the line 16—16 as indicated in Fig. 17.

Fig. 17 is a fragmentary horizontal sectional view through the assembly of Fig. 16 and taken in the plane of the line 17—17.

Fig. 18 is a fragmentary horizontal sectional view through the device of Fig. 16 and taken in the plane of the line 18—18, with the sash tilted inwardly through a small angle.

Fig. 19 is a fragmentary horizontal sectional view through the device of Fig. 16 and taken in the plane of line 19—19.

Fig. 20 is a fragmentary longitudinal sectional view showing in detail the friction roller arrangement utilized in the position controlling link illustrated in Fig. 14.

Fig. 21 is a fragmentary perspective view illustrating still another embodiment of the invention and showing the guideways, position control means and a sash carrier, together with a sash which has been swung inwardly.

Fig. 22 is a horizontal sectional view taken through one side of a window constructed as indicated in Fig. 21 but installed as shown in Figs. 1 and 12.

Fig. 23 is a fragmentary vertical sectional view taken in the plane of the line 23—23 in Fig. 22 and with the sash in the closed position.

While the invention is susceptible of various modifications and alternative constructions, certain preferred embodiments have been shown in the drawings and will be herein described in some detail, but it is to be understood that there is no intention to limit the invention to the specific forms disclosed, the intention being, on the contrary, to cover all modifications and alternative constructions falling within the spirit and scope of the invention as expressed in the appended claims.

Referring to the drawings, each of the illustrative windows embodying the present invention and shown in Figs. 1 and 12 is organized upon a generally rectangular frame 30 comprising the usual parallel side members or jambs 31 spanned at top and bottom respectively by a head-jamb or yoke (not shown) and a sill 32. Mounted for vertical sliding movement in each of the window frames are glazed upper and lower sashes 34, 35, each of rectangular form and having somewhat conventional side rails 36 connected at their extremities by top and bottom rails 38 and 39, respectively. Also mounted in the frame 30 but outwardly of the upper and lower sashes is a storm sash 40 which is fabricated in two complemental parts to facilitate its installation from the interior of a room. For purposes of clearer illustration, one of the side jambs 31 and various parts associated therewith have been omitted from the drawing, but it will be readily understood that such omitted structure duplicates that which is shown.

Upon reference to Figs. 1, 2 and 7, it will be observed that the conventional stops or guiding strips ordinarily mounted on the side jambs for directing the vertical sliding movement of window sashes have been discarded in favor of a somewhat different arrangement. Accordingly, the frame 30 is provided with two pairs of laterally spaced parallel guideways 41 of L-shaped cross section and vertically disposed along the side jambs 31. In the present instance, the guideways 41 are defined by the use of three preformed strips of sheet metal molding 42, 44 and 45 attached to each of the jambs 31 as by means of screws 46 and in closely spaced relationship to each other.

In order to permit the upper sash 34 to be swung inwardly without interference, the latter is made of slightly narrower width than the lower sash 35. This difference is accommodated by offsetting the planes of the molding strip surfaces abutting the side rails of the sash 34 from the planes of like surfaces abutting the side rails of the lower sash 35. It can now be appreciated that the foregoing guideway construction, by reason of its simplicity and low cost, is particularly useful in the conversion of conventional windows to those embodying the invention.

Slidably housed in each pair of the guideways 41 are corresponding pairs of sash carriers 48 which serve to mount the sashes 34 and 35 for vertical sliding movement parallel to the general plane of the window frame 30. As indicated in Fig. 2, each carrier 48 may be fashioned by combining light, preformed structural angles and channels, the final product having a general cross section resembling the shape of the letter J. Since the carrier mountings are similar for both sashes and symmetrical with respect to opposite sides of the sash and frame assembly, a description of the relationship between one carrier and that portion of the sash adjacent thereto will suffice for all.

Turning now to Figs. 9 and 10, it will be seen that the side rail 36 of the sash there shown is provided with a length of weather stripping 49 of L-shaped cross section. One leg of the L is rigidly secured in a longitudinal slot 50 in the side rail. The other leg of the strip 49 lies parallel with the surface of the side rail but is separated therefrom by a slight clearance distance for receiving a flange 51 which is unitary with the carrier 48. Adjacent the lower extremity of the latter, the flange 51 is extended downwardly and a hole formed therein about on the longitudinal center line of the former. Pivotally attached to such downwardly extending portion of the flange 51 as by means of a screw 52 passing through the hole therein is the adjacent side rail 36 of the sash (see Fig. 11) the point of attachment being located near the lower end of such side rail. With the arrangement described, the sash when rocked about its pivotal axis to an upstanding position is substantially parallel to the general plane of the frame 30 and is longitudinally alined with the carrier 48. Under such circumstances, the projecting flange of the weather strip 49 is snugly housed between the body of the carrier 48 and the flange 51 thereof, constituting a highly effective weather-tight seal.

Provision is made whereby each sash may be adjustably positioned at any desired point along the course of its vertical sliding movement with respect to the frame 30. In the present instance, this is accomplished by the use of motion arresting means in the form of a plurality of spiral spring loading units 54 having extensible flexible tapes 55, shown in Fig. 8. The units 54 are mounted in recesses in the jambs 31 located in the upper regions thereof, one pair of the former being required for each sash. Those portions of the molding strips 42 and 44 overlying the units 54 are slotted as at 56, thereby allowing the tapes 55 to be led therethrough and into suitable tape channels 58 formed in the molding strips. The depending end of each of the tapes 55 is connected to an adjacent sash rail 36 by means of a short length of flexible cable 59, after the manner shown in Fig. 10. When a sash and its carriers are in alinement, the spring units through their tapes 55 and connecting cables 59 serve to overcome that portion of the weight of the sash not balanced by the friction in the guideways 41. Thus a sash together with its carriers, if stopped at any arbitrarily selected point along the course of its vertical sliding movement, will remain in an equilibrium condition with no tendency to move either up or down.

In the practice of the invention, means is also provided for utilizing the foregoing vertical positioning means for adjustably positioning each sash at any desired angle with respect to the general plane of the window frame and within the limits of arcuate movement of the sash. Referring again to Fig. 10, it will be observed that the flexible cable 59 is led over a stationary guiding spool 60 mounted on the sash carrier and thence to a point of attachment 61 on the sash located relatively close to the pivotal axis thereof. This structure is of course duplicated on the side of the sash opposite the one illustrated in the drawing. Thus when the sash is swung inwardly, a tension force is brought to bear upon both loading units and their tapes 55. Such forces are opposed by tension forces exerted by the spiral springs in the units 54. The total spring force is just sufficient to offset that portion of the weight component of the sash not balanced out by friction and which would otherwise cause the sash to fall inwardly. As in the case of positioning the sashes vertically, the foregoing arrangement effectively places an inwardly tilted sash in an equilibrium condition, making is possible to adjust the latter at various angles with respect to the plane of the window frame without having the sash move until readjusted.

To allow for the contingency of a strong wind upon the window while the storm sash 40 is either removed or opened, a simple expedient is employed for positively locking the lower sash 35 in one or more angular positions. This is accomplished by mounting on the bottom rail 39 of the upper sash a slotted link 62 pivotally assosiated with the window lock 64 (see Fig. 1). The link 62 when swung perpendicular to the plane of the sash 34 is adapted to engage the shank of a threaded stud carrying a wing nut 65. With the parts thus engaged, the lower sash 35 may be swung inwardly and firmly secured at various angular positions by merely tightening down on the wing nut 65.

Pivotally mounted adjacent the upper extremity of each sash carrier 48 is a relatively small retaining latch 66, best shown in Figs. 4, 9, and 10. The latch is formed with a dog 68 adapted to engage a small boss 69 projecting laterally from the upper end of the sash weather stripping 49. Upon engagement of such parts, the retaining latches serve to hold the sash tightly against the carriers for vertical sliding movement therewith as a single unit. When disengaged, the latches permit their associated sashes to be swung inwardly about the pivotal axes thereof.

Suitable means is provided for precluding vertical sliding movement of the sash carriers 48 when the sashes are tilted inwardly. In the present instance, such means comprises an interlock 70 mounted on each sash carrier 48 near the upper end thereof. As indicated in Figs. 4, 9, and 10, the interlock 70 comprises a relatively small rockable pawl or lever 71 biased into a distended position with respect to the sash carrier by means of a wire spring 72 mounted on the latter. The end of the lever 71 opposite the one engaged by the spring is provided with a laterally projecting boss 74 of appropriate length to engage any one of a series of notches 75 in the molding strips 42 and 44 adjacent the guideways 41. Assuming that a sash has been positioned vertically at a point where the bosses 74 of its carrier interlocks lie in alinement with a pair of the notches 75, disengagement of the associated retaining latches 66 will immediately permit the bosses 74 to register with the notches 75 and thus prevent relative sliding movement between the carriers 48 and their guideways. At the same time, the biasing force of the spring 72 on the lever 71 will rock the sash inwardly through a slight angle to a point where the fingers may easily be slipped over the outside edge of the top rail 38 for tilting the sash further. Under the foregoing circumstances, the carriers will be prevented from sliding vertically as long as the sash remains at an angle to the plane of the window frame. In the event that the bosses 74 should not be alined with a pair of the notches 75 upon release of the retaining latches, provision is made for precluding inward swinging movement of the sash until the latter is moved vertically through a sufficient distance to bring about such alinement. For this purpose, the rockable lever 71 is formed with a dog 76 projecting into the path of the boss 69 on each sash. Registration of the interlock bosses 74 with the notches 75, however, enables the spring 72 to rock the lever through a sufficient angle for its dog 76 to clear the boss 69 of the sash.

Turning now to the storm sash 40 illustrated in Figs. 1 and 3, it will be seen that the complemental sections thereof abuttingly engage each other along a tongue-and-groove joint 78, being detachably retained in such condition by means of a pair of latches 79 only one of which is shown in the drawing. The storm sash 40 is positioned in the window frame by means of a guideway located between the external molding of the frame 30 and the sheet metal molding strip 45. The bottom rail of the sash 40 comprises two members 80 and 81 hinged together as at 82. Thus the lowermost member 81 may be folded upwardly upon the member 80 as indicated in broken outline in Fig. 3, thereby shortening the overall height of the storm sash. The latter may then be slid vertically so as to locate the resulting open space at either the bottom or the top of the window frame 30 or, if desired, such space may be divided between the top and bottom of the frame.

With the arrangement described, a substantial number of combinations of sash adjustments may be made so as to furnish optionally direct or indirect ventilation. For example, if it be desired to quickly ventilate a smoke filled room, the member 81 of the storm sash 40 may be folded upon the member 80 and the storm sash slid downwardly so as to provide an open space between the latter and the head-jamb of the window frame 30. With the lower sash 35 closed, the upper sash 34 may then be lowered, thus providing a direct path of egress for the warm smoke filled air. On the other hand, if indirect ventilation be desired, the storm sash may be adjusted in the manner described and either the sash 34 or the sash 35, or both, may then be swung inwardly so as to provide a tortuous path for the currents of air entering or leaving the room.

In Figs. 12 to 20 inclusive, a modified embodiment of the invention is illustrated. While the general arrangement of the sashes with respect to the frame remains substantially unchanged a slightly different construction is employed in the sash mountings. As indicated in Figs. 12 and 13, vertical guideways 41a of L-shaped cross section are provided for the sash carriers, the former being defined by mounting a pair of slotted guide strips 84 in closely spaced relation along each of the side jambs 31. In the present instance, the guide strips 84 may be formed of wood and installed in a manner which is susceptible of easy withdrawal from the frame for servicing. The guide strips for the upper sash, as in the embodiment previously described, are spaced somewhat closer together than those for the lower one in order to permit tilting of the upper sash without interference by the guide strips for the lower sash. It might be noted in passing that the latter are provided with a rigidly attached finishing molding 85 which, when the window is installed, overlies wall corner bead 86 and a marginal area of wall plaster 88. The use of this construction permits removal of any and all parts from the inside of the window frame 30 without damage to either the plaster or the paint on the wall.

Referring more particularly to Figs. 13 and 14, it will be seen that simplified sash carriers have been utilized comprising unitary channel members 48a adapted to slide vertically in the guideways 41a. Pivotally attached to respective pairs of the carriers 48a are the upper and lower sashes 34 and 35, the latter being secured thereto by means of mounting screws 52a carried by the sashes and registering with alined holes adjacent the lower extremities of the flanges of the carrier channels 48a and the weather stripping members 49.

For the purpose of adjustably positioning the sashes 34 and 35 vertically, each is provided with movement arresting means of a frictional character. As shown in Figs. 16 and 19, such means includes a stationary assembly mounted upon a flat plate 89 and recessed in an elongate cavity within the guiding strip 84. In the present instance, the plate 89 is bolted solidly to the guiding strip as at 90 with the outer surface of the plate substantially flush with that surface of the strip which abuts against the carrier 48a. The motion arresting device itself comprises a roller 91 adapted to engage frictionally the inner bottom surface of the channel element constituting the sash carrier, together with a downwardly inclined leaf spring 92 and an adjusting screw 94. The device is arranged to prevent downward vertical movement of the sash by producing a wedging action between the roller 91, the leaf spring 92 and the sash carrier as the sash tends to move under its own weight. Conversely, if a lifting force should be applied to the sash, the device will immediately release due to the fact that the leaf spring can no longer crowd the roller against the sash carrier. The magnitude of the frictional force produced by the device can be readily altered by means of the adjusting screw 94.

A motion arresting device 95, similar in character to the foregoing, and for releasably maintaining a sash at any desired angular position along the course of its arcuate movement is shown in Figs. 14 and 20. In the application of such device, a pair of links 96 of variable length are each pivotally attached at their respective extremities to a sash carrier and to its corresponding side rail. Each link comprises a pair of relatively slidable bars 97 and 98, the latter having rigidly secured to one of its ends a housing sleeve 99 through which the bar 97 passes. The end portion of the bar 98 attached to the sleeve 99 is bent into a relatively long flat hook-like shape and, together with the sleeve, houses a friction device for arresting relative axial sliding motion between the bars in a direction tending to increase the overall length of the link 96. Such friction device includes a leaf spring 100 having a contour which converges toward the inner surface of the rod 97. Positioned between the latter and the spring 100 as by means of a spacer block 101 and a locating spring 102 is a hardened roller 104 adapted to be wedged tightly between the spring 100 and the bar 97 in response to sliding movement of the bars tending to lengthen the link 96 and to disengage upon movement in the opposite direction. The magnitude of the frictional force exerted by the device may be accurately regulated through the use of an adjusting screw 105 which limits the travel of the roller 104 toward the fully engaged position. By the same token, the maximum length to which the link 96 can be extended, and consequently the maximum angle to which the sash can be opened, may be fixed by the use of a sleeve-like mechanical stop 106 unitary with the bar 97.

As illustrated in Fig. 20, the link 96 has a one-way acting characteristic. Accordingly, when installed it serves to resist swinging movement of the sash away from the plane of the window frame but releases when the sash is moved in the opposite direction. However, if found desirable, the structure of the link 96 could readily be made double acting by adding a duplicate set of parts within the housing sleeve 99, such set being susceptible of frictional engagement in response to relative movement of the bars 97, 98 tending to shorten the link 96.

The relationship of the retainer latches to the sash carriers in the present modification differs somewhat from that already described. Thus each sash is provided with a pair of latches 68a pivotally attached adjacent the respective upper ends of the side rails 36 and housed within narrow recesses 108 between the latter and the weather stripping 49. Each of the latches 68a has a downwardly projecting dog 109 adapted to enter into complemental engagement with a notch 110 cut in the upper edge of the side wall of the sash carrier 48a. The raising of the retainer latches 68a through a small angle serves to disengage their dogs from the notches 110, consequently permitting the sash to be swung inwardly upon the pivots 52a.

An appropriate interlocking means 70a for precluding vertical sliding movement of the carriers while their respective sashes are tilted away from the general plane of the window frame 30 is associated with each of the guide strips 84, being mounted on the stationary plate 89 and housed within the elongate recess of the molding strip 84 along with the vertical movement arresting means. For this purpose, a spring biased interlock pawl or lever 111 is rockably disposed upon the plate 89 and carries a dog 112 projecting laterally from one of its arms, such dog being adapted to engage any one of a series of longitudinally spaced notches 114 along the edge of the narrower side wall of the sash carrier. The opposite arm of the lever 111 is fashioned with a dog 115 adapted to abut against the side rail 36 of the sash when the latter is parallel with the plane of the window frame as indicated in Fig. 17. With the sash thus positioned, the dog 112 is held clear of the notches 114 in the wall of the carrier 48a. When the sash is swung inwardly, however, the biasing spring of the lever 111 rocks the latter through a small angle and against a mechanical stop 116, bringing the dog 112 into registration with one of the notches 114 in the side wall of the sash carrier 48a as shown in Fig. 18. Under such circumstances, the carrier 48a remains locked against vertical sliding movement until the sash is returned to its vertical position, whereupon the dog 112 becomes disengaged from the notch 114. In the event that the dog 112 should fail to register with one of the notches as the sash is tilted, this can easily be remedied by sliding the sash and carrier vertically through a very slight distance so as to bring the dog 112 into alinement with an adjacent notch 114.

In Figs. 21 to 23 inclusive, a further modified embodiment of the invention is illustrated wherein a common frictional motion arresting means is utilized for positioning a sash both vertically and angularly. This is accomplished in the present instance by providing, at each side of the sash, structure including a longitudinally slotted guide tube 118 mounted adjacent each of the guideways 41a and housing a guide bar 119. The ends of the latter extend somewhat beyond those of the guide tube 118, being secured as by screws 120 to the guide strip 84 or to a spacer strip along the jamb 31 and in spaced apart relationship with the inner walls of the tube 118. Surrounding the bar 119 and slidable therealong within the guide tube 118 is a sleeve 99a for a roller friction device 95a, the details of which are similar to those of the device 95 illustrated in Fig. 20. Rigidly attached to such sleeve and bent in an elongated hook-like shape so as to house the elements of the friction member is a second bar 121, analogous to the bar 98 of the device shown in Fig. 20 but of substantially shorter length, and adapted to slide relative to the guide bar 119. The bar 121 is swivelly connected to an anchor fitting 122 on the rail 36 of the sash by means of a simple link 124 of proper thickness to pass freely through the slot in the guide tube 118.

The internal elements of the above friction device, comprising a leaf spring 100a, a spacer block 101a, locating spring 102a, a roller 104a and an adjusting screw 105a are arranged to coact in a manner similar to their counterparts in Fig. 20. Thus, the device 95a illustrated in Fig. 23 is adapted to frictionally resist downward sliding movement of the sash due to the resulting wedging action between the guide bar 119, the roller 104a and the leaf spring 100a, but to immediately release upon movement of the sash in the opposite direction. On the other hand, when the sash is unlatched from each carrier 48a, the latter and the sash pivot point 52a become vertically fixed due to the action of the interlock lever 111. If the sash should then be swung inwardly upon its pivot 52a by the application of an external force, the connecting link 124 will serve to slide the device 95a downwardly in the guide tube 118. The device 95a, as already explained, sets up a frictional opposition when so moved and as a result it prevents further inward swinging movement of the sash upon discontinuation of the external force thereon at any given point. By the same token, upon the application of a force tending to swing the sash back into the plane of the window frame, the toggle action between the connecting link 124 and the sash will initiate upward sliding movement of the device 95a within the guide tube 118 and immediately terminate the frictional drag between such device and the guide bar 119. For this reason, the sash may be restored to an upright condition with the use of a comparatively small force.

We claim as our invention:

1. In a window having a generally rectangular frame comprising a pair of spaced apart parallel side jambs spanned respectively at top and bottom by a head jamb and a sill, the combination of guide strips mounted against the side jambs of said frame and defining longitudinal guideways along the former, paired sash carriers adapted for sliding movement relative to said guide strips and associated with respective ones of the guideways, at least one of said carriers in each pair having an edge with longitudinally spaced notches therealong, window sashes pivotally mounted on respective pairs of said carriers for arcuate movement into and out of the general plane of said frame, manually actuated latches for holding said sashes and carriers together for bodily movement in such general plane, means for adjustably positioning said sashes together with their corresponding carriers at selected points along the guideways, extensible link means for adjustably maintaining said sashes in any selected position within the limits of arcuate movement of the latter, and at least one spring loaded interlock pawl mounted on one of said side jambs for arcuate movement in a direction parallel to that of said sashes, said interlock pawl being arranged to coact with said longitudinally spaced notches in said carrier to preclude relative sliding movement between said guide strips and a corresponding pair of said carriers at given ones of said selected points when its respective sash lies outside the general plane of said frame, said interlock pawl being susceptible of automatic disengagement upon the return of said sash to the plane of said frame.

2. In a window having a frame including a pair or spaced apart parallel side jambs, the combination of guide strips mounted on said side jambs and defining thereon longitudinal guideways, sash carriers mounted in the guideways for relative sliding movement with respect to said guide strips and parallel to the general plane of said frame, a sash pivotally mounted on said carriers for swinging movement with respect to the same and to the plane of said frame, said sash also being susceptible of bodily movement with said carriers parallel to the plane of said frame, disengageable latch means for preventing relative swinging movement between said sash and said carriers, yieldable counterbalancing devices interposed between said frame and said carriers for adjustably maintaining said carriers and said sash at any selected position within the limits of their movement parallel to the plane of said frame, and at least one extensible and retractable link disposed between said sash and said carriers for maintaining said sash in any desired angular position within the limits of swinging movement thereof.

3. In a window having a frame including a pair of spaced apart parallel side jambs, the combination of guide strips mounted on said side jambs to define vertical guideways, sash carriers mounted in the guideways for sliding movement relative to said guide strips, one of said carriers having longitudinally spaced notches therein, a sash pivotally mounted on said carriers for bodily movement therewith and for swinging movement into and out of the plane of the guideways, disengageable retainer latches for preventing relative swinging movement between said sash and said carriers, releasable motion arresting devices interposed between said carriers and said frame for adjustably maintaining said carriers and said sash at any selected position along the guideways, extensible and retractable link means operatively disposed between said sash and said carriers for maintaining said sash at any point within the limits of swinging movement thereof, and a spring biased interlock mounted on a pivot fixed relative to one of said side jambs for cooperation with said carrier having the longitudinally spaced notches therein, said interlock in cooperation with said notched carrier being adapted to prevent movement along the guideways of said carrier and said sash at one of said selected positions when the sash is swung out of the plane of the guideways, said interlock having a sash-actuated dog for rendering it disengageable upon the return of said sash to such plane.

4. In a window, the combination comprising a frame, guide strips disposed along the sides of said frame and defining longitudinal guideways thereon, sash carriers slidably mounted in the guideways for movement parallel to the plane of said frame, a friction device including a roller and an inclined leaf spring interposed between one of said carriers and one of said guide strips for releasably positioning the former at any selected point along the guideways, a sash mounted on said carriers for bodily sliding movement therewith and for swinging movement with respect to the general plane of said frame, a pair of self-adjusting extensible links of variable length pivotally connected between said carriers and said sash for releasably positioning the latter at any desired angle with the plane of said frame and between the limits of swinging movement of said sash, each of said links including a frictional device for yieldably resisting changes in the length of the former, and a spring biased interlock pawl pivotally mounted on one of said guide strips for preventing relative sliding movement between said carriers and said guide strips when said sash is swung out of the general plane of said frame, said interlock pawl being disengageable upon the return of said sash to such plane.

OLIEN POLSON.
THEODORE J. NELSON.

References Cited in the file of this patent

UNITED STATES PATENTS

| Number | Name | Date |
|---|---|---|
| 514,773 | Riddelle | Feb. 13, 1894 |
| 642,749 | McChesney | Feb. 6, 1900 |
| 1,450,697 | Mitchell | Apr. 3, 1923 |
| 1,690,386 | Tunez | Nov. 6, 1928 |
| 2,006,745 | Polson et al. | July 2, 1935 |
| 2,017,652 | Carl | Oct. 15, 1935 |
| 2,126,177 | Dennis | Aug. 9, 1938 |
| 2,287,741 | Levyn | June 23, 1942 |